United States Patent Office 3,168,325
Patented Feb. 2, 1965

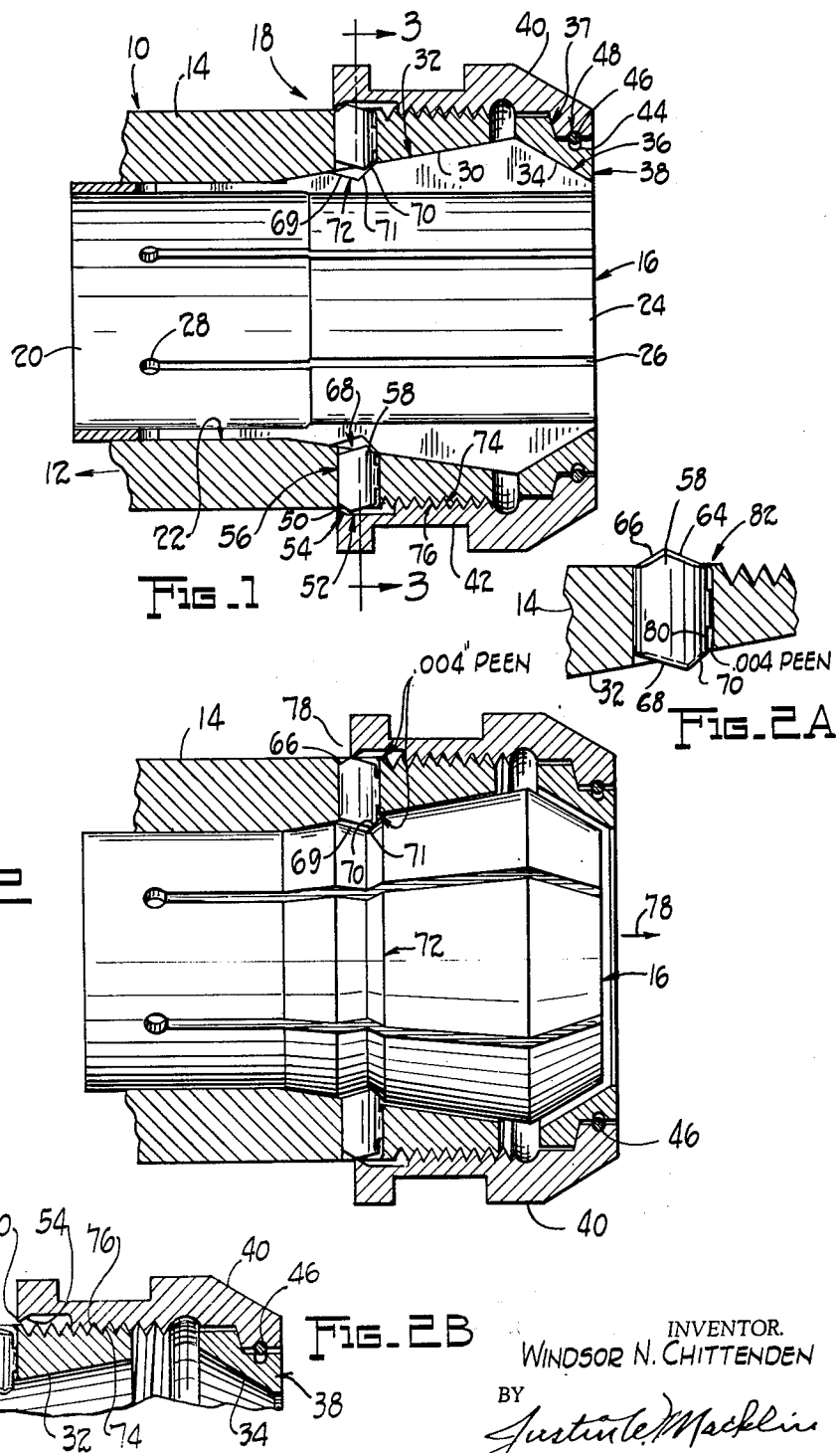

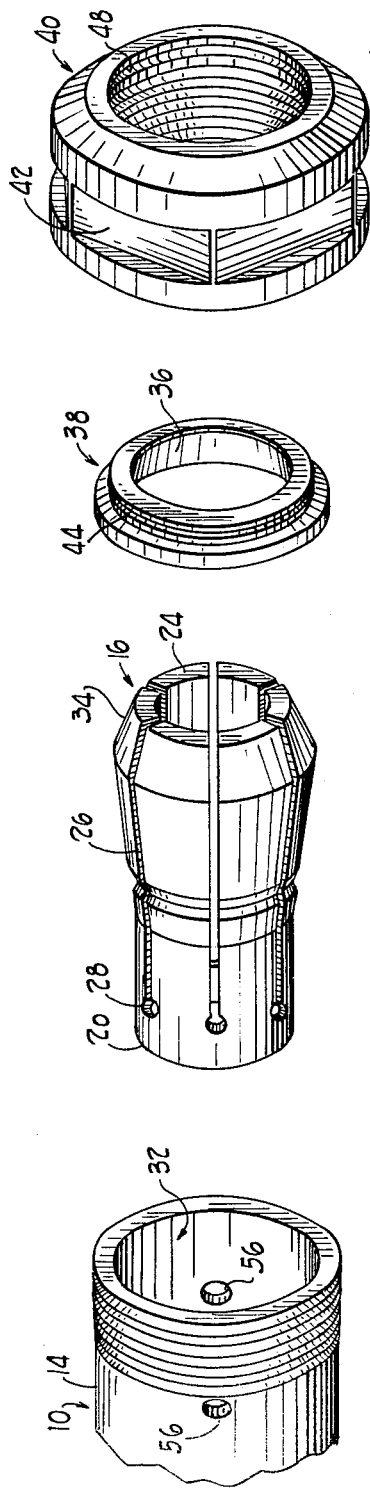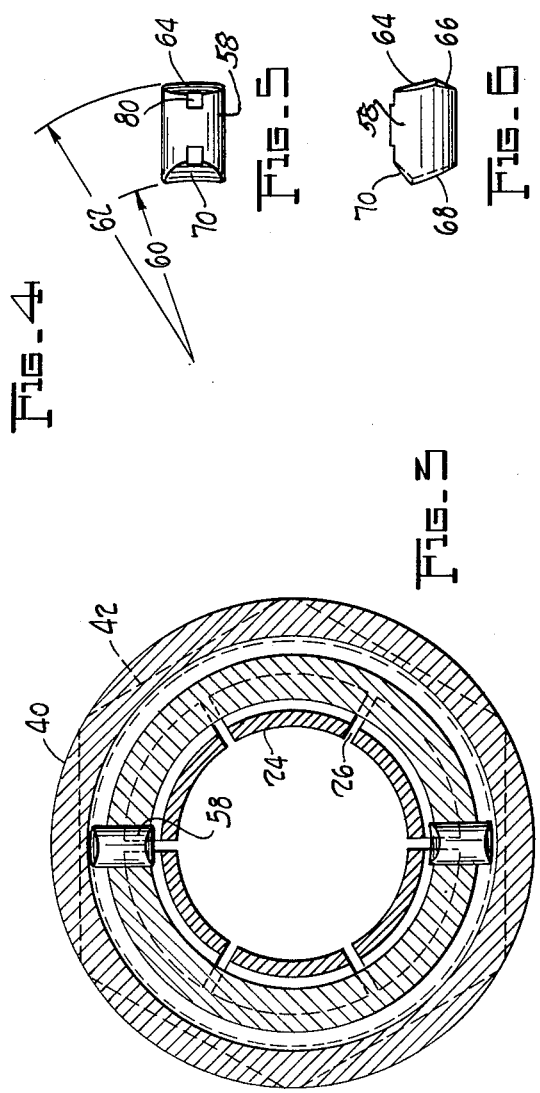

3,168,325
SPRING COLLET CHUCK WITH COLLET
RELEASING MEANS
Windsor N. Chittenden, 130 8th Ave. SE., Largo, Fla.
Filed July 16, 1963, Ser. No. 295,446
5 Claims. (Cl. 279—51)

This invention relates to improved collet chucks; and more particularly to spring collet chucks characterized by greater holding power and at the same time incorporating mechanism operating in an automatic manner for release of the collet without damage; and to the method of operation.

The problem

Collet chucks are superior instruments for holding shank-type bits, reamers, grinding tools and the like in many precision machines. A very high degree of accuracy between the exterior of the collet and the interior of the hollow tapered bore of the chuck shank contributes to tremendous gripping and tool turning power and contributes to the accuracy of these devices. These have been developed to an extremely high degree of perfection.

However, this high degree of perfection has led to some rather serious difficulties. Thus, when the taper on the exterior of the collet and the mating taper on the interior of the chuck bore are finished to a high degree of perfection, a Johannsen block-like adherence or seizure takes place between the tapers due to the superfinish and elasticity of the materials. In short, the perfectly mated tapers stick or adhere together so tenaciously when forced together under extreme pressures as required for holding high speed, heavy duty shank-type tools of modern technology, that removal of the collet often results in injury to the precision bearings of the spindle on which the collet or tapers are employed.

It will be obvious that these tools are too precise and highly machined to tolerate the use of drift pins and hammers for their removal. Further, due to their high finish they are very expensive. The art has been developed to provide mechanisms tending to nullify the damage factor, but the advantages of prior release devices have more than been offset by the fact that they limit employment of the full potential of the tool; and further they impose the requirement of conscious manipulation of the collet to permit its insertion and removal from the chuck body. Further, compromise of accuracy, inclusion of dirt during assembly and others have been encountered as disadvantages.

It must be remembered of course that a high degree of accuracy may be damaged by using anything of a twisting nature for collet removal, because of the accuracy of the mate between the tapers.

Accordingly a substantial advance to the art would be provided by a novel spring collet chuck characterized by improved, non-damaging collet release to avoid having such an assembly of tool holding means from being completely debauched and obsoleting the hundreds of thousands of these collets in use through industry today.

Accordingly it is an important object to provide a mating taper release system.

A further object is to provide improved spring collet chucks characterized by gentle release of collet without damage to the righly finished collect and chuck tapers.

A further object is to provide alteration to existing spring collet chucks to embrace the improvement of invention and thus broaden the utility of units already in the field.

A further object is to provide a spring collet release characterized by automatic release upon release of the collet nut.

Other patents of record have this feature also, but function by interposing stiff and bulky ring in nut between pressure ring and chuck or cup. This is the feature which inhibits full employment of potential use of this present system.

A still further object is to provide a method of releasing a spring collet or analogous tapered body without distortion.

A preferred embodiment of the present invention is illustrated in the accompanying drawings. It is to be understood however that modifications may be made without departing from the essence of invention as defined in the appended claims.

FIG. 1 is an axial sectional view of an improved spring collet chuck embodying the invention and showing position of release pins in collet locked position;

FIG. 2 is an axial sectional view similar to FIG. 1, showing the position of pins with nut released and tapers unlocked and collet set free;

FIG. 2A is an enlarged view showing the guide peens which orient the release pins;

FIG. 2B is an enlarged detail section on the same plane as FIG. 2, omitting the collet and showing the relation of the cam lip or taper 54 to the external threads engaged by the clamping nut and showing one of the collet releasing pins in its inner idle position;

FIG. 3 is a transverse sectional view taken along line 3—3 of FIG. 1;

FIG. 4 is an exploded perspective view illustrating the component parts of the chuck of FIG. 1;

FIG. 5 is an elevational view of a release pin; and

FIG. 6 is a plan view of a release pin.

The environment

The environmental surroundings of the present invention comprise two mating tapers which are subject to seizure when pressed together. In one typical aspect this takes the form of a collet chuck including a spring collet. Thus the collet chuck includes a hollow body 10 provided with a shank portion 12 whereby it can be fitted within the socket of a work spindle of a modern precision cutting tool or grinder, or be fashioned as an integral element of spindle or adapter. The hollow body 10 includes an annular head 14 which received a spring collet and release mechanism of invention.

The spring collet

This is designated 16 and the release mechanism generally by the reference numeral 18.

The collet 16 has an annular shank 20 which fits within a bore 22 of head 14 and shank 12. Note that due to the fact that the improved release mechanism of invention makes removal so gentle and distortion-free, it is possible for this hollow shank to have a relatively thin wall. As will become evident from the progressing description, this provides improved flexibility to the gripper fingers or jaws of the collet with tremendously greater holding power.

It will be noted that the other end of the collet takes the form of a plurality of jaws 24 and these are produced by axially slitting the collet along the lines 26 from the nose end toward the shank, terminating in openings 28 and providing flexibility without tendency to rupture at the base of the slit.

The external profile of the collet includes an elongated outward taper from the shank 20, and designated 30. This taper 30 coacts with a correspondingly tapered seat 32 formed in an annular head 14 of chuck body 10. The nose of the collet is more abruptly tapered at 34 to match a taper 36 of clamping ring 38. Note that tapers 34, 36 extend at an acute angle to the axis of the collet and at a greater angle than the angle of tapers 30, 32 and in a reverse direction thereto. By application of appropriate pressure to the surfaces 34, 36 the collet will be moved axially into the chuck body so that the surfaces 30, 32 will force jaws 24 radially inwardly for gripping a tool shank.

Gripping force is applied through a clamping nut 40 which, as shown in the right hand end element of FIG. 4, is provided with flats 42 to receive a suitable wrench for tightening.

As shown in FIG. 1, at the nose end, the clamping nut 40 is internally formed to the exterior contour of the clamping ring 38, and in accordance with my prior patent, No. 2,272,185, dated February 10, 1942, contains a floating shoulder arrangement at 37. The outer periphery of the clamp ring is provided with a groove 44 to receive a snap-type retaining spring 46. The inner surface of the small bore of nut 40 is also grooved at 48; thus when the pressure ring 38 with retainer spring 46 in place therein is inserted, the spring snaps outwardly into groove 48, as shown in FIG. 1, to lock the two units together axially and eliminates all possibility of interference with axial alignment of tapers.

This engagement and the shoulder 37 provides freedom of float to compensate for nut 40 skewing action as explained in my prior patent. It will be noted that this location of the retainer spring prevents any likelihood of the floating collet tightening floating ring 38 to move inwardly to its collet tightening position without the retaining spring being interposed between the clamping ring and the end of the head of the chuck body or interfering with the threads. This retaining spring however, being removable, permits convenient removal and replacement of the floating collet tightening ring.

Nut modification

Nut 40 contains a slight modification from stock, in the form of a bore 50 to major thread diameter. This increases to a clearance area 52 between the threads and the pin actuating cam taper surface 54 at the inner end of the nut.

Two or more holes 56 are then drilled radially through the annular head or adapter 14 to align with the clearance area 52 and the angle 54, with the nut in operable position.

Thereafter a pin 58 is placed in each hole 56. These pins are of a suitable length to be hereinafter described. As shown in FIGS. 5 and 6, each pin 58 is contoured on the inner end to a radius 60, and to a radius 62 on the outer end, as appears particularly in FIG. 5. Further, the pins are angled at 64, 66 on the outer end and at 68, 70 on the inner end.

It will be noted that about midway of its length, the collet 16 is provided externally with an angled groove 72. This is of the same general profile as the inner angles 68, 70 and radius 60. It will thus be evident that if a pin 58 is moved radially inwardly it will mate with the angled groove 72. Note that the front side of groove 72 is longer than the inner angle 70 so that when the pins are moved inwardly there is a camming action urging the collet to the right. It will be seen that the threads of the nut 76 engaging the external threads 74 of the chuck body will effect this camming action as the nut is turned to move outwardly. That is, the taper or cam surface 54 at the inner end of the nut engaging the corresponding slopes 66 at the outer ends of the pins, very forcibly urge the pins inwardly, effecting a corresponding cam action of the pins acting upon the outer abrupt slope of the groove in the collet. Thus, as the slopes 70 of the pins so engage the slope of the groove in the collet, a very effective force is exerted, loosening the collet from the taper of the chuck body. A very important objective of avoiding distortion or damaging of the collet is thus attained.

Visualizing the assembly

The collet is first inserted in the adapter 14. Thereafter the nut 40 with clamping ring 38 in place is threaded on until the back edge is over the pins 58. Note that the rear side of groove 72, namely 69, provides clearance for this to take place.

Noting the operation in further detail, it will be seen that with the back edge 78 of nut 40, see FIG. 2, over the pins, the pins are depressed preventing the collet from seating in the taper until the tool shank is inserted. Tightening the nut as shown in FIG. 1 then causes the pins to ride up on the front angle 71, raising the pin in the clearance area of the nut. It will be noted that there is clearance and that nut 40 can then be tightened as desired to clamp the shank of the tool.

Referring to FIG. 2, we note that the nut has been backed off so that the back edge 78 has engaged the inner angle 70 of pin 58 to force the pin inwardly and break the seizure very gently at the inner of the .004" peen areas by pressing the inner angled face 70 of the pin against the front side 71 of collet groove 72.

In one typical embodiment of the invention, the groove 72 of the collet has a 45° angle on the forward side and a 75° angle on the rear side. However, this is typical and not to be limiting.

The manner in which the pins are oriented is shown in the enlarged view of FIG. 2A and in FIGS. 5 and 6 where it will be noted that two small flats 80 are provided adjacent the ends and that after the pins are inserted in their holes, small peens 82 of about .004", approximately the same as the depth of the flats, are provided to both limit movement of the pins and provide proper orientation.

In the event of a conversion in an already hardened collet holder, a bushing can be inserted in which the pins ride, with the peens staked on the bushing.

Advantages of invention

From the foregoing it will be evident that the release pin system and method of invention is automatic, requiring no consideration on the part of the user.

The pins function to slide inwardly to release position on reversal of the nut and outwardly to the floating position as determined by the staked upsets when the tool is held. They do not provide pressure at this time.

The actual movement of the pins in releasing the tapers is probably no more than about .005". The balance of movement of the pins functions simply to permit introduction of the collet and application of the nut. Therefore the subtlety with which the adhesion is broken and the obvious lack of deformation of the collet will be clearly evident from this very tiny amount of movement to release or break the seizure between the tapers.

The method of invention may be expressed as the application of radial inward pressure to the inner of mating tapers to develop axial thrust at the periphery of the taper to break the seizure.

As to the number of pins that can be employed, two are all that is normally necessary. However, a plurality of pins is here disclosed. The reason for employing only two is to simplify manufacture and assembly.

It will be noted that the floating compression ring has its outer portion open sufficiently to permit the passage of a tool shank into the collet and corresponding ready removal upon the loosening of the collet.

Extended scope of invention

The pin principle and method of invention can be applied in various ways other than in spring collet chucks, and other specific mention is application to an expanding mandrel, or generally where sticking tapers are encountered. It might also be mentioned that the invention is applicable to the separation of other tapers and eliminate the use of drift pins with the consequent hazard of bearing damage resulting therefrom.

An additional advantage of the invention is that in the case of highly flexible spring collets, the pins engaging the groove in the collet may function to prevent the collet being moved inwardly too far, and thus reducing the shank receiving diameter prematurely, that is, before the shank has been inserted.

Other modes of applying the principles of this invention may be employed instead of those specifically set forth above, changes being made as regards the details herein disclosed, provided the elements set forth in any of the following claims, or the equivalent of such, be employed.

What I claim is:

1. In a spring collet chuck having an annular body with an internal taper mating an external taper on the collet carried therein and having a nut to tighten the collet,
   the chuck body having circumferentially spaced radial guide holes therethrough,
   an angularly bottomed groove formed circumferentially of said collet, functionally registering with said holes,
   a pin radially floating in each hole and having an end profile to engage said groove to impart radial pressure and axial thrust thereto,
   and means on said nut engageable with said pins to move the pins radially against the angular surfaces of the collet groove to exert said pressure and thrust.

2. The invention of claim 1 including means for orienting the pins so that the end profile engages said groove to produce said pressure and thrust.

3. In a spring collet chuck,
   an annular chuck body defining an inside taper at the nose end,
   a spring collet received in said body and having an outside taper matching said inside taper,
   a nut threaded on said body and carrying means to force said collect in a direction engaging said tapers,
   a radial bore in said body and through said inside taper,
   an annular groove on said outside taper of the collet,
   said groove having an angled bottom face,
   a pin longitudinally movable in said bore,
   a cam face on the inner end of said pin engageable with said angled bottom face of said groove to apply axial and radial bias,
   means orienting said pin to provide engagement between said angled bottom face and said cam face on movement of said pin,
   and means carried by said nut and engageable with said pin to impose longitudinal inward movement thereto.

4. An apparatus for releasing a machine tool comprising inner and outer mated tapers wherein the outer taper is formed within an annular body element,
   circumferentially spaced radially extending guide holes in the annular body element and passing through the outer taper,
   a notch-like groove in the collet positioned to register with said holes,
   a pin in each hole and having a nose contoured to engage said groove to radially and axially bias said collet,
   and means to bias said pin radially inwardly against a surface of said groove.

5. In a tool holding chuck having a body with an inner taper and a collet with an outer taper mating the body and a tightening nut,
   a contoured circumferential groove on the collet taper,
   radially moveable elements carried by the body and each having its inner end shaped to the curved contour of said circumferential groove,
   the outer portion being similarly curve contoured with a wedging surface coacting with a surface of the nut,
   whereby axial movement of the nut forces the elements radially inwardly effecting an axial wedging action releasing the adhesion between the tapers and moving the collet axially to a free position.

References Cited by the Examiner

UNITED STATES PATENTS

| 1,081,183 | 12/13 | Wood | 279—51 |
| 2,177,979 | 10/39 | Davis | 279—49 |
| 2,396,006 | 3/46 | Hall | 279—51 |
| 2,403,768 | 7/46 | Stoner | 279—51 |
| 2,465,837 | 3/49 | Benjamin | 279—52 |
| 2,608,886 | 9/52 | Morse. | |
| 2,684,527 | 7/54 | Hedlund | 29—427 |
| 2,853,774 | 9/58 | Peterson | 29—427 |

ROBERT C. RIORDON, *Primary Examiner.*